United States Patent [19]
Dougherty et al.

[11] Patent Number: 5,156,932
[45] Date of Patent: Oct. 20, 1992

[54] SIMPLE OPTIMIZED LEAD-ACID BATTERY

[75] Inventors: Thomas J. Dougherty, Waukesha; James S. Symanski, Grafton, both of Wis.

[73] Assignee: Globe-Union, Inc., Milwaukee, Wis.

[21] Appl. No.: 694,907

[22] Filed: May 2, 1991

[51] Int. Cl.$^5$ ...................... H01M 2/24; H01M 10/04
[52] U.S. Cl. .................................... 429/160; 429/162; 29/623.2
[58] Field of Search ................. 429/158, 159, 160, 82, 429/161, 210; 29/623.2

[56] References Cited

U.S. PATENT DOCUMENTS

| | | | |
|---|---|---|---|
| 2,632,782 | 3/1953 | Coleman et al. | 429/158 X |
| 4,098,967 | 7/1978 | Biddick et al. | |
| 4,383,011 | 5/1983 | McClelland et al. | 429/160 |
| 4,406,057 | 9/1983 | Oswald et al. | |
| 4,505,996 | 3/1985 | Simonton | 429/159 X |
| 4,530,153 | 7/1985 | Pearson | |
| 4,900,643 | 2/1990 | Eskra et al. | |
| 5,004,655 | 4/1991 | Symanski | |

*Primary Examiner*—Stephen Kalafut
*Attorney, Agent, or Firm*—Foley & Lardner

[57] ABSTRACT

A simple, optimized lead-acid battery includes a stack of a plurality of film pouches, each containing positive and negative electrode elements and separators. The pouches are prepared by folding an elongate film strip, and collector tabs are provided for the electrodes at either end of the stack. Electrode pairs intermediate the ends of the stack are electrically connected through adjoining openings in the pouch walls, e.g. be welding. In the most preferred embodiment, an integral vent is formed from flaps cut in the film strip and the pouch edges and top are heat sealed for electrolyte containment.

24 Claims, 4 Drawing Sheets

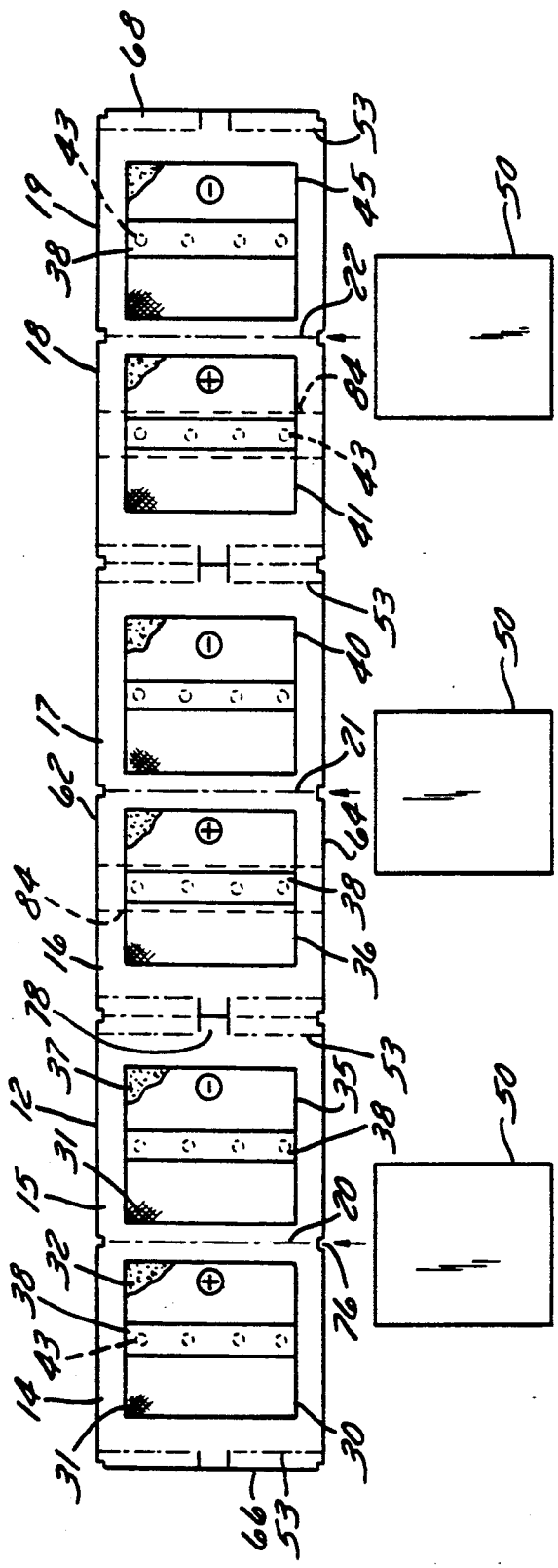
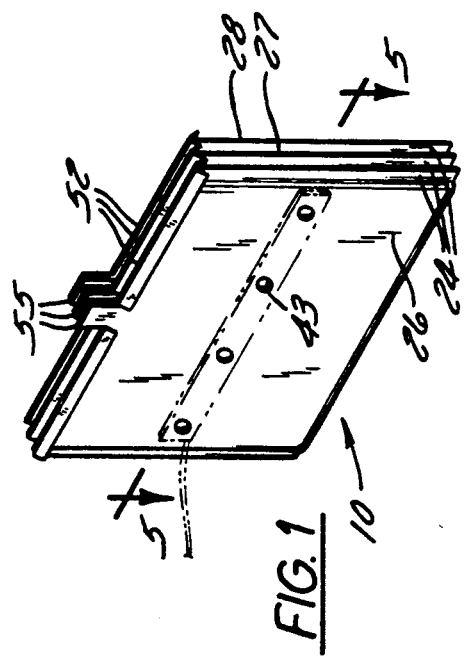

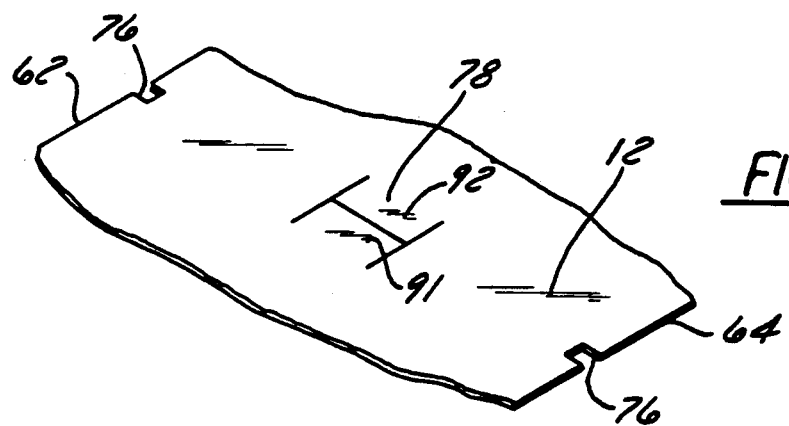
FIG. 6A
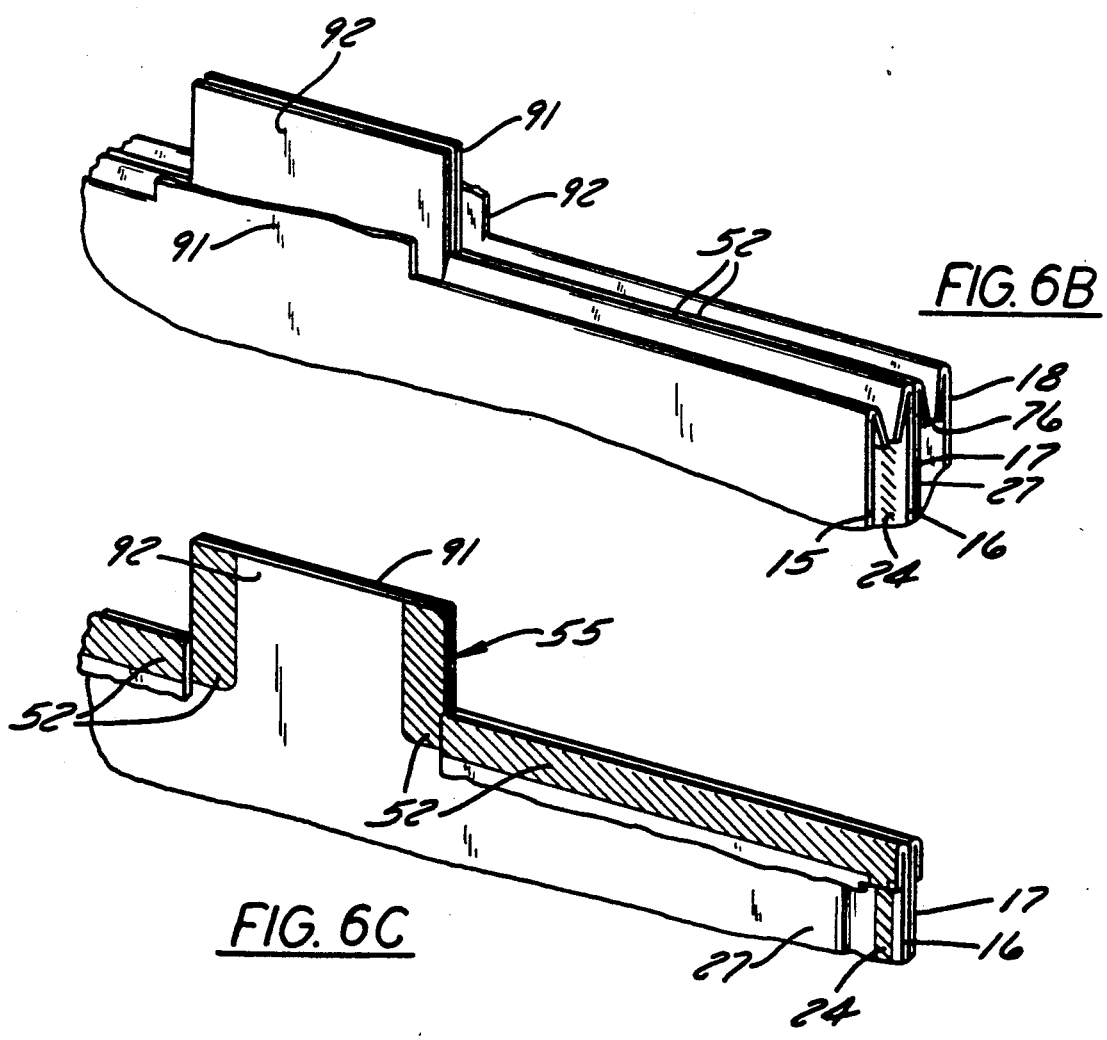
FIG. 6B
FIG. 6C

SIMPLE OPTIMIZED LEAD-ACID BATTERY

BACKGROUND OF THE INVENTION

1. Field of the Invention

The present invention relates generally to the art of storage batteries and more particularly to thin, SLI (storage, lighting, ignition) batteries of the type which do not require bulky or heavy containers, covers, straps or conventional battery venting systems. Still more specifically, the present invention relates to a battery made by locating pasted plate grids on plastic sheeting, folding the sheeting, accordion style, electrically connecting certain of the plates and then sealing the sheeting to produce a flat, high voltage battery.

2. Description of the Prior Art

Traditional lead-acid batteries suffer from the characteristic ohmic resistance provided by the electrode grid, grid lug, electrode current strap and intercell connections. Moreover, traditional lead-acid batteries are bulky and require space consuming containers, covers, venting devices and the like. These components add considerably to the weight of battery, a problem with today's lightweight automobiles, the desire to continually improve fuel efficiency. Bipolar batteries have been suggested as an alternative because of the elimination of some of these components. Because bipolar batteries have a thin, lightweight construction, it has been suggested that such batteries may be used as replacements for many traditional SLI applications.

Generally, a bipolar battery is one having positive and negative active materials adhered to opposite sides of a conductive plate substrate. The function of the bipolar substrate is to allow current to pass from one electrode to the other through the substrate, thereby eliminating the need for grid lugs, current straps and intercell connections. Bipolar plates can be tightly stacked against each other, with suitable electrolyte present, thus occupying less space. Examples of such bipolar batteries are shown in Biddick, et al. U.S. Pat. No. 4,098,967 issued Jul. 4, 1978 and Eskra, et al. U.S. Pat. No. 4,900,643 issued Feb. 13, 1990.

Biddick, et al. suggests the use of conductive plastic substrates, while the Eskra, et al. patent describes a substrate of plastic conductive material having a metallic wire mesh disposed therein. In the latter patent, a single sheet of wire material is folded about the conductive plastic, tent style, and embedded in the plastic to provide structural and electrical advantages.

Another patent which discusses the use of folding for battery construction is U.S. Pat. No. 4,406,057 issued Sep. 27, 1983 to Oswald, et al. In this patent, an element stack is provided using relatively small electrode plates positioned in a spaced apart manner along a strip of separator material. The strip is folded, accordion style, and the stack is completed by inserting a second set of electrode plates of opposite polarity in the folds. The patentees suggest that the construction technique is amenable to automation and that the resulting cell stack may be handled as a unit thereby facilitating battery assembly.

While the latter patent does disclose a flat stack battery of bipolar nature, the patent still suffers from the drawbacks encountered by trying to pass electrons through a substrate material rather than from conductive grid to conductive grid. Moreover, the placement of electrode plates in the proper position in an accordion fold, where alignment is particularly important, creates manufacturing difficulties.

Pearson, in U.S. Pat. No. 4,530,153 issued Jul. 23, 1985 for "Manufacturing Recombination Electric Storage Cells" describes a cell pack of alternating positive and negative electrodes interleaved with separator material. The active material is damp when the layers are inserted into a plastic bag, and the cell pack is cured to a dry state while in the bag. In an illustrated embodiment each electrode is folded once about an electrode of opposite charge, and individual cells are connected by spot welding together adjacent take-off lugs, each of which is located on an upper edge of a folded electrode. A final rigid housing contains the multi-cell packs. The battery does not include individual cell pouches or any continuous strip of material to facilitate rapid fabrication of the battery.

There continues to exist, therefore, a need for lightweight batteries of a monopolar design which do not require bulky, expensive and heavy containers, current straps, etc. It would also be highly desirable to provide a fast battery construction technique which could be adapted to a wide variety of battery sizes and shapes.

It has also been proposed in the bipolar battery art to use "duck-bill" type venting systems for the gasses generated during battery formation. Such a system is described in U.S. Pat. No. 5,004,655 by Symanski, issued Apr. 2, 1991 for "Thin Bipolar Lead-Acid Battery With Individual Cell Vent". In this application, a frame is provided for the electrode and separator materials, the frame including vent passageways. The frame is sandwiched between sheeting of insulating plastic. A duck-bill type vent system is provided at the peripheral edge of the overlapping and sealed plastic to allow gases of formation to escape. It would be desirable to have such a venting system in a monopolar, thin optimized lead-acid battery.

SUMMARY OF THE INVENTION

The present invention provides a solution to the drawbacks set forth above. The simple optimized lead-acid battery of the preferred embodiment of the present invention provides a thin battery providing high voltage. The battery of the present invention provides a lightweight system which may be easily vented, eliminating complex structure used in SLI batteries previously known.

The battery of the present invention also permits the fast and automated manufacture of a wide variety of battery shapes and sizes. The battery of the invention also provides excellent current flow and current distribution and maintains many of the bipolar advantages of size and weight.

How the battery of the present invention accomplishes such benefits can best be understood by reference to the following detailed description of the preferred embodiment taken in conjunction with the drawings. Generally, however, the battery is constructed utilizing an elongate strip of plastic material, onto which prepasted positive an negative grids of battery material are placed. The plastic is folded, accordion style, and separators are provided between adjacent positive and negative plates. Sealing of the plastic along its edges and along the top, and providing end plates having take-off lug connectors, completes the construction of pouches into which electrolyte is placed. A unique and convenient venting system is provided by cutting and folding the plastic material during the manufacturing step, and the positive and negative plates are coupled to one another through openings in the plastic, e.g. by welding. The openings are sealed to prevent escape of electrolyte, e.g. by the use of adhesive tape. Other ways in which the battery of the invention provide the aforementioned advantages will become apparent to those skilled in the art after the detailed description has been read and understood.

DESCRIPTION OF THE DRAWINGS

FIG. 1 is a perspective view of an assembled cell element stack of a representative battery of the preferred embodiment of the present invention;

FIG. 2 is a top plan view of a plastic strip and battery plate arrangement used to form the battery shown in FIG. 1;

FIG. 6A is a perspective view of a portion of a plastic strip showing the die cut for a vent assembly;

FIG. 6B is an enlarged perspective view of the vent flaps in an unsealed condition; and FIG. 6C is an enlarged view of the vent flap sealing arrangement.

In the various FIGURES, like reference numerals are used to indicate like components.

DETAILED DESCRIPTION OF PREFERRED EMBODIMENTS

Before proceeding to the detailed description of the most preferred embodiment, it should be stated that the illustrated embodiment may be modified by increasing or decreasing the number of cells, the size of the cells or plates contained therein, the construction of the grid material, the paste formulations, the current collection system, the electrolyte formulation, etc. Each of these factors could be determined for a particular application by one skilled in the design of lead-acid batteries and the selection of components therefor, after such skilled artisan becomes familiar with the teachings of the present invention. An example of the foregoing is the illustrated use of an expanded metal grid as the base for the pasted electrodes. While such materials are preferred because of weight reduction factors, solid sheets could be used in the present invention. Another example is the use of the self-forming duck-bill vent in the illustrated embodiment. Other types of venting systems could be substituted therefor without departing from the intended scope of this invention.

Figure 5:
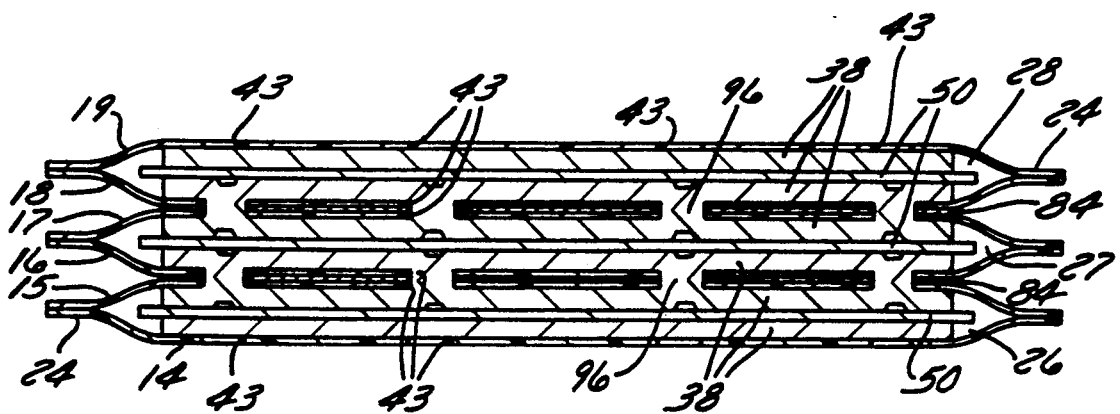
FIG. 5 is a cross sectional view taken along the line 5—5 of FIG. 1.

FIG. 1 shows in perspective form (not to scale since some components have been shown in greater size or thickness for clarity of description) a folded battery 10 according to the preferred form of the invention. As will become more fully appreciated from that FIGURE and FIGS. 2, 3 and 5, battery 10 is formed from an elongate strip of plastic material 12, which in the illustrated form has been folded to form six generally parallel, generally square cell walls 14, 15, 16, 17, 18 and 19. Fold lines are formed at the bottom of each of the pairs 14-15, 16-17, 18-19 as illustrated respectively at 20, 21 and 22, and the sides of the respective pairs of plastic sheeting are sealed as shown at 24 in a manner which will be described in greater detail hereafter. The result is the formation of three pouches 26-28.

A pair of battery electrodes is provided in each of pouches 26-28, and each will be described in sequence at this time. The outside electrode in pouch 26 is a positive electrode 30 which is generally square in configuration and in the preferred form is prepared from an expanded metal type grid 31 pasted with any positive active material 32 known to the battery art. A center strip 38 of lead, unpasted, is provided for this electrode and all other electrodes described herein.

The second and third electrodes 35 and 36 will now be described. Electrode 35 also includes a grid 31, again preferably of expanded metal, but this electrode is pasted with negative active material 37. It is spaced apart from the next electrode 36 (positive) and is coupled thereto in a manner described later. Electrode 36 is similar to electrode 30.

The fourth and fifth electrodes 40 and 41 are similar in all respects to electrodes 35 and 36, i.e. negative and positive respectively, and each includes the center unpasted areas 38. It should be appreciated then that the two electrode pairs just described are adjacent to one another but are in adjoining pouches, electrodes 35 and 36 in pouches 26 and 27 and electrodes 40 and 41 in pouches 27 and 28. A final electrode is disposed in pouch 28, this time a negative pasted electrode 45.

From this description it will be appreciated that pairs of positive and negative electrodes are provided in each of pouches 26-28, and one skilled in this art will readily appreciate that they should be electrically separated from one another. This is accomplished in the illustrated form of the invention by placing separator sheets 50 between each electrode pair. From this description it should also be noted that sealing of the top of pouches 26-28 is necessary and such is accomplished by sealing each of them, as at 52, as can be more fully appreciated by reference to FIG. 1.

A final feature of the battery 10 is a cell vent 55 for each pouch, vents 55 comprising in the illustrated embodiment, a pair of flaps formed from the plastic material 12 and joined along their edges to form an elongate duck-bill like seal. Vents 55 permit gases evolved during formation to escape the pouches 26-28, while preventing entry of contaminants.

Before continuing with a description of the techniques employed for manufacture of battery 10, a few more comments about materials are warranted. First, the plastic material used for strip 12 may be selected from a number of resins, such as high density polyethylene, polypropylene, polyethylene terephthalate, ABS plastics, PVC and the like. The material must be non-conductive and must be able to withstand the physical and chemical conditions which will be encountered during battery manufacture and use. For example, the plastic should be able to retain its physical properties after prolonged exposure to the harsh acidic environment of sulfuric acid electrolytes and should also be able to withstand prolonged exposure to temperature extremes of between $-50°$ F. and $+150°$ F. for most applications. The most preferred material for use in strip 12 is that three component laminate identified in the aforementioned Symanski patent which provides an ideal combination of strength, sealability and resistance to oxygen and moisture permeability. Fiberglass mats or glass filled resins may be employed for separator sheets 50, as can other materials suggested as separators in the art. This material too must be able to withstand the same conditions as the plastic material 12.

In addition to lead, other materials can be used for the conductive grids, such as conductive transition metal oxides and the like. Furthermore, a wide variety of shapes may be employed for the electrodes, e.g. rectangular.

Referring next to FIG. 2, a top plan view, plastic strip 12 is shown and the electrodes referred to in FIG. 1 are disposed therealong. Note that each of the electrodes is generally similar in size to the other and the "+" and "—" notations on the FIGURE are used to differentiate those electrodes which are pasted with positive paste material from those which are pasted with negative paste material. The spacing of the electrodes from one another, from the sides 62 and 64 of strip 12 and from the ends 66 and 68 of strip 12 is selected to permit sealing of sides 24 (see FIG. 5) and the top seal 52 (see FIG. 1).

In this FIGURE, the reader will be able to notice a series of holes 43 provided in plastic strip 12 in a location corresponding to the unformed lead strips 38 of electrodes 30, 35-36, 40-41 and 45. The holes are spaced apart from one another in a transverse line and the number and size of the holes can vary. One hole of about $\frac{1}{4}"-\frac{1}{2}"$ diameter for every two inches of width of plastic strip 12 is preferred. It will be appreciated then that when the strip is folded accordion style, electrodes 35 and 36 and electrodes 40 and 41 would be generally parallel to one another and with the two sets of holes mating. Similar holes would be located beneath other electrode pairs if a larger battery were being prepared than the one illustrated in the FIGURES. The holes adjacent the unformed strips 38 of the end electrodes 30 and 45 provide access for current collection, e.g. by a conductive current collector bar 99 (shown in phantom). Alternatively, collector tabs could be provided on the end electrode.

Also to be noted in FIG. 2 are the series of location slots 76 and die cuts 78 provided in strip 12. The location slots on either edge 62 and 64 of the strip are used to mark the center of a top fold 52, while the die cuts 78 are used to form an integral vent 55, the details of which will also be shown later.

The only other materials used for the construction of battery 10 are strips of adhesive tape 84, preferably double sided, two of which are shown in dotted line in FIG. 2 below electrodes 36 and 41 because they are below the strip 12. Tape 84 also includes holes arranged to mate with holes 43 as folding takes place. Tape 84 assists in holding adjoining section of strip 12 in a proper orientation. The most preferred tapes are PE 2132 or AR 516, products which are described later herein. The tape, in addition to facilitating assembly, also prevents the escape of electrolyte. Single sided adhesive tape would serve the latter purpose, but would not provide the manufacturing advantage. Electrolyte, of course, would be added to each of the pouches, e.g. through vents 55 and formation of the battery 10 would take place according to procedures which, in and of themselves, are well known to the lead-acid storage battery art.

Figure 3:
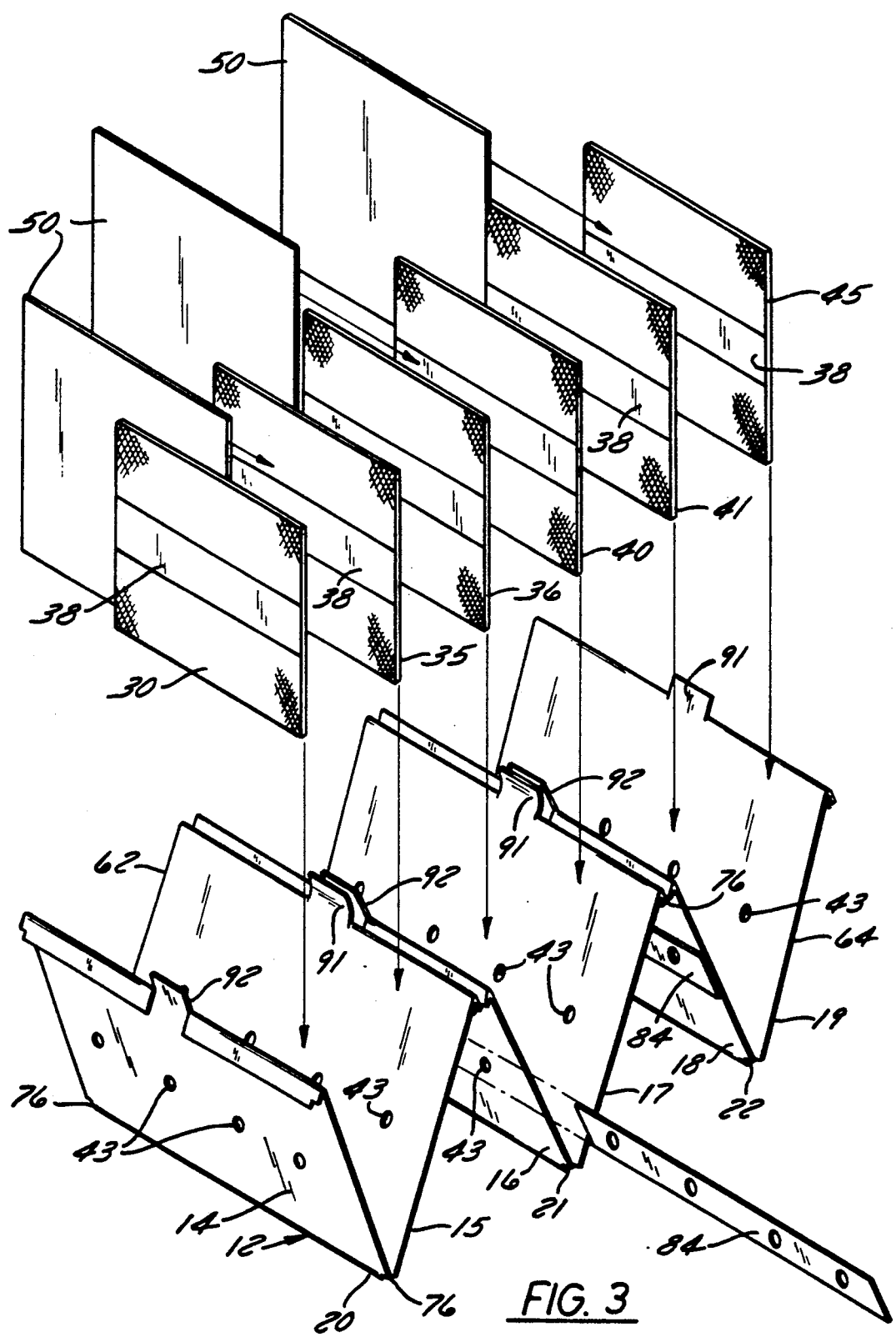
FIG. 3 is a schematic view of the element assembly arrangement for the battery of FIG. 1.
Figure 4:
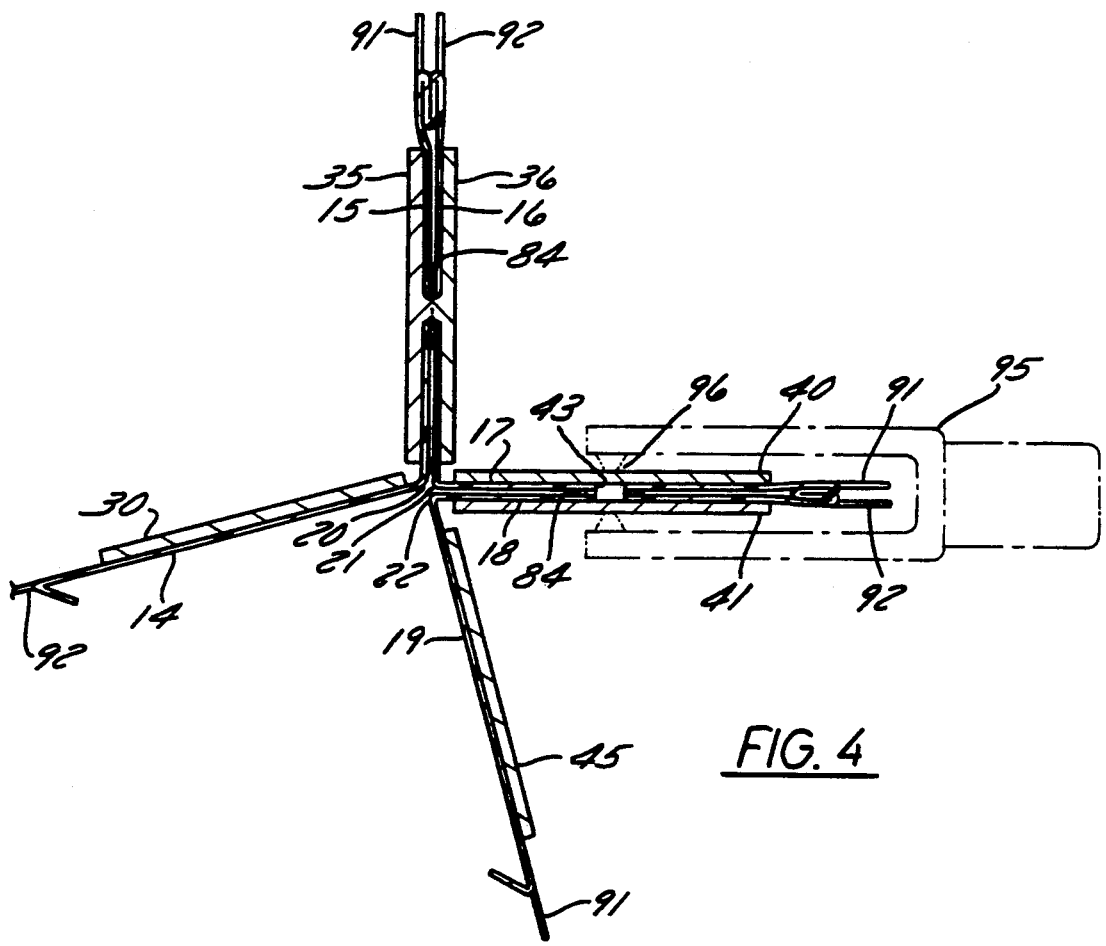
FIG. 4 is a partially prepared battery, showing the materials used in FIG. 2, and illustrating one plate joining technique employed in the preferred embodiment.

Further steps in the assembly of battery 10 are shown in FIGS. 3 and 4 where electrode 30 has been located adjacent to but spaced inwardly of end 66 of strip 12. A separator 50 of known design is added at the fold line 20, following which battery electrodes 35 and 36 are placed on strip 12. They will be oriented properly when a fold is made across the double fold lines 52 extending between the locator cut-outs 76. Once adjoining each other and separated by strip sections 15 and 16 and a layer of tape 84, the center strips 38 of electrodes 35 and 36 are preferably welded to one another, using any known welding technique, e.g. TOX or upset welding. The welding elements 95 are shown schematically in FIG. 4, contacting the central parts of the electrodes in the areas of strips 38 so that a weld 96 results to electrically connect the electrodes. The procedure would be repeated for electrodes 40 and 41 after another separator 50 is placed between electrodes 36 and 40. In lieu of welding, strips 38 can be joined by other techniques, such as by using a conductive epoxy adhesive or conductive tape adhesives. Battery manufacture continues with the addition of yet another separator 50 between electrode 41, and the final electrode 45 of the embodiment. Electrode 45 can be held in place using the holes 43, but no welding is performed on that electrode.

Two other aspects of the battery construction include the sealing of strip 12 to form containment compartments for each of the cells and the completion of the vents 55 for each of them. Discussing first the sealing of the pouches, the preferred method is to employ a thermoplastic resin for the strip 12 and to form the seals by means of heat and pressure. The sealing line would extend up the sides of the pouches on both sides 62 and 64 of the strip and the fold lines 52 would similarly be heat sealed, except in the area of the vents 55 soon to be discussed.

The pouches for the end electrodes and the welded electrode pairs (which really exist in adjacent pouches) can be sealed manually or automatically, and in some cases may be sealed by adhesives rather than heat. For example, if strip 12 were PVC, an epoxy or solvent based adhesive could be used. Suitable adhesives would be those suitable for securely attaching the strip portions to one another and which are capable of withstanding the harsh chemical and physical environment involved with lead-acid batteries. For example, the adhesive would have to be resistant to the acid electrolyte and to the temperature extremes to which lead-acid batteries are typically exposed. For polyolefins a tape adhesive can be used such as PE 2132 or AR 516 manufactured by Adhesives Research Incorporated or Glen Park.

The vents 55 may be variously embodied, and may be the duck-bill type of vent described in the aforementioned Symanski patent, which could simply be inserted into a slit in the top fold 52 or, as is contemplated by the illustrated preferred embodiment, can be made from strip 12 by the die cutting and folding technique now to be described.

FIGS. 6A, 6B and 6C show in detail the portion of strip 12 where it is desired to form a vent 55. As seen best in FIG. 6A, the strip 12 is cut in an "H" pattern, centrally and longitudinally with respect to the longer dimensions of the strip. The "H" is located so that its joining line is located intermediate to locator cut outs 76 and approximately half way between sides 62 and 64. The cut creates a pair of flaps 91 and 92 which are used to form the vents 55.

Referring next to FIG. 6B, the flaps 91 and 92 are shown after assuming a confronting relationship as the fold is made along fold line 52, with its opposite member from the previous fold. Flap 92 from side 14 is joined to flap 91 from side 15 to form the vent for pouch 26. This procedure is continued to form the vents for pouches 27 and 28. Since the object of the vent is to permit gases of formation to be released from a pouch, it then becomes apparent that the sealing of the vertically extending sides of such flaps and along the fold line 52 will result in the desired vent formation. It is also contemplated that an oil film (not shown) could be placed between the open middle section of the vent 55, to prevent air entry into the pouch. For more detail on this concept, reference is made to the Symanski patent previously referred to.

Other sealing techniques, such as tape release adhesives, can also be used for forming the seals, the requirements for which are the same as those mentioned above in connection with the side and top sealing. It will also be appreciated that the slit line creating the flaps 91 and 92 causes an opening between the pouches which is of no moment to the operation of the battery system.

Numerous variations of the illustrated embodiment will appear to those skilled in the art after reading the present specification. For example, battery power can be increased by using three or more sets of welded electrodes. Any number of such integral electrodes could be added to fulfill the needs for a particular system. Moreover, while the illustrated fabrication technique is believed to be the most efficient, the principles of the present invention could be adapted to a system where a number of stacked and vented pouches, each containing positive and negative electrode elements and separators, are joined to one another through adjoining side walls using the techniques described above. Containment of the pouches is not necessary, but the designer could include a rigid or flexible outside container if desired. The objective of weight reduction is best achieved, however, by not using a container such as those presently used in automobile batteries. The present invention is not to be limited by the illustrated embodiment, but is to be limited only by the scope of the claims which follow.

What is claimed is:

1. A simple, optimized lead-acid battery comprising electrode elements, separators, electrolyte and a resin film pouch containment system, said battery comprising:
   pasted positive electrode elements;
   pasted negative electrode elements;
   separators disposed between adjacent positive and negative electrode elements;
   at least two film pouches for containing in each a positive electrode element, a separator and a negative electrode element, the pouches each including front and back panels and generally sealed edges, said battery having on one end a positive electrode element and on the other end a negative electrode element;
   each of said electrode elements except said end electrode elements having an unpasted conductive area;
   openings in the panels of said film pouches corresponding to the unpasted areas; and
   the conductive area of each electrode element except the end of electrode elements being electrically joined to the conductive area of an adjacent electrode element in an adjoining pouch through said openings.

2. The battery of claim 1, wherein said joined electrodes are welded to one another.

3. The battery of claim 1, wherein said pouches each include a bottom fold, adjoining side edges and adjoining top edges, said side and top edges being sealed to prevent leakage of electrolyte from said battery.

4. The battery of claim 3, wherein said film is a thermoplastic film and the side and top edges are heat sealed to one another.

5. The battery of claim 3, wherein an adhesive joins said side and top edges.

6. The battery of claim 1, wherein each film pouch includes a vent.

7. The battery of claim 1, wherein said film pouches are formed from a continuous strip of film.

8. The battery of claim 7, wherein each film pouch includes a vent.

9. The battery of claim 8, wherein said vent is prepared from the continuous strip of film.

10. The battery of claim 9, wherein said vent comprises a pair of parallel and confronting flaps, the vertical edges of which are sealed to one another to form a channel communicating with the interior of the pouch.

11. The battery of claim 10, wherein said film is a thermoplastic resin and the vertical edges are heat sealed to one another.

12. The battery of claim 7, wherein said front panels of the film pouches include side and top edges which are sealed to opposing side and top edges of the back panels of the pouches.

13. The battery of claim 12, wherein the film is a thermoplastic film and the edges are heat sealed.

14. The battery of claim 12, wherein an adhesive seals the side and top edges.

15. A method for preparing a simple, optimized lead-acid battery comprising electrode elements, separators, electrolyte and a resin film pouch containment system, said method comprising;
   providing an elongate strip of the resin film;
   disposing along the strip, and spaced apart from one another, alternating positive and negative electrode elements;
   folding the strip to form a plurality of film pouches having front and back panels each containing a positive and a negative electrode element;
   inserting a separator between the electrode elements of each pouch;
   electrically coupling a positive electrode element of one pouch to the adjacent negative element in an adjoining pouch, the coupling occurring through openings in the panels of the pouches created by the folding step and
   sealing the side edges and top of each pouch and adding electrolyte to each pouch.

16. The method of claim 15 comprising the further step of providing a vent for each pouch.

17. The method of claim 16 wherein the step of providing the vent is accomplished by forming a pair of flaps in the film strip which confront each other after the folding step and sealing the edges thereof to have an open channel communicating with the pouch interior.

18. The method of claim 15 wherein the electrode elements include a conductive area in the area of the openings.

19. The method of claim 18 wherein the coupling is accomplished by welding.

20. The method of claim 15 comprising the additional step of placing a strip of adhesive tape across the walls of the pouches, the tape having openings conforming with the openings in the walls.

21. The method claim 20 wherein the tape is a double sided adhesive tape and adheres the adjoining pouches to one another and prevents the escape of electrolyte therefrom.

22. The method of claim 15 wherein the film strip is a thermoplastic resin film strip and the sealing step is accomplished by heat sealing.

23. A simple, optimized lead-acid battery comprising electrode elements, separators, electrolyte and a resin film pouch containment system comprising:
- a plurality of resin film pouches, each pouch including a front and back walls and containing a positive electrode element, a separator and a negative electrode element and electrolyte;
- a vent for each pouch;
- the pouches being stacked so that the positive and negative electrode elements are alternated in the stack;
- the adjacent positive and negative electrode elements in adjoining pouches being electrically connected through openings in the walls of the pouches; and
- current collectors on the positive and negative electrode elements at the end of the stack.

24. A method for preparing a simple, optimized lead-acid battery comprising the steps of:
- providing a plurality of resin film pouches including front and back walls, each pouch containing a positive electrode element, a separator and a negative electrode element;
- stacking the resin pouches;
- providing current collectors on the positive and negative electrode elements at the end of the stack; and
- electrically joining the adjacent positive and negative electrode elements in adjoining pouches through openings in the walls of the pouches.

* * * * *